US009576015B1

(12) United States Patent
Tolnay et al.

(10) Patent No.: US 9,576,015 B1
(45) Date of Patent: Feb. 21, 2017

(54) DOMAIN-SPECIFIC LANGUAGE FOR DATASET TRANSFORMATIONS

(71) Applicant: Palantir Technologies, Inc., Palo Alto, CA (US)

(72) Inventors: David Tolnay, Palo Alto, CA (US); Punyashloka Biswal, New Haven, CT (US); Andrew Colombi, San Francisco, CA (US); Yupeng Fu, San Jose, CA (US); Ashar Fuadi, Bogor, ID (US); Mingyu Kim, Palo Alto, CA (US); Paul Nepywoda, Palo Alto, CA (US); Akshay Pundle, Cupertino, CA (US); Juan Tamayo, San Francisco, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

(21) Appl. No.: 14/874,690

(22) Filed: Oct. 5, 2015

Related U.S. Application Data

(60) Provisional application No. 62/216,192, filed on Sep. 9, 2015.

(51) Int. Cl.
*G06F 17/30* (2006.01)

(52) U.S. Cl.
CPC .. *G06F 17/30345* (2013.01); *G06F 17/30958* (2013.01); *G06F 17/30961* (2013.01)

(58) Field of Classification Search
None
See application file for complete search history.

(56) References Cited

U.S. PATENT DOCUMENTS 5,632,009 A     5/1997   Rao et al.
6,167,405 A * 12/2000   Rosensteel, Jr. .. G06F 17/30592
(Continued)

FOREIGN PATENT DOCUMENTS

CA         2666364       1/2015
DE     102014204840     9/2014
(Continued)

OTHER PUBLICATIONS

U.S. Appl. No. 14/504,103, filed Oct. 1, 2014, Notice of Allowance, Sep. 9, 2014.
(Continued)

*Primary Examiner* — Belix M Ortiz Ditren
(74) *Attorney, Agent, or Firm* — Hickman Palermo Becker Bingham LLP

(57) ABSTRACT

Techniques related to a domain-specific language for dataset transformations are disclosed. A server computer may process a table definition composed in a domain-specific language. The table definition may include a sequence of one or more dataset transformations to be performed on one or more source tables to generate a target table. The sequence may include a customized transformation. A source dataset may be provided as input to an implementation of the customized transformation. An output dataset may be generated as a result of executing the implementation. An intermediate table may be generated based on performing at least one dataset transformation on a particular source table. A supplemental portion for the intermediate table may be generated based on performing the at least one dataset transformation on an appended portion of the particular source table. The target table may be generated based on combining the supplemental portion with the intermediate table.

14 Claims, 9 Drawing Sheets

(56) References Cited

U.S. PATENT DOCUMENTS

| | | |
|---|---|---|
| 6,289,338 B1 | 9/2001 | Stoffel et al. |
| 6,456,997 B1 | 9/2002 | Shukla |
| 6,463,404 B1 | 10/2002 | Appleby |
| 6,523,172 B1 | 2/2003 | Martinez-Guerra et al. |
| 6,539,538 B1 | 3/2003 | Brewster et al. |
| 6,594,672 B1 | 7/2003 | Lampson et al. |
| 6,640,231 B1 | 10/2003 | Andersen et al. |
| 6,748,481 B1 | 6/2004 | Parry et al. |
| 6,877,137 B1 | 4/2005 | Rivette et al. |
| 6,980,984 B1 | 12/2005 | Huffman et al. |
| 7,027,974 B1 | 4/2006 | Busch et al. |
| 7,089,541 B2 | 8/2006 | Ungar |
| 7,237,192 B1 | 6/2007 | Stephenson et al. |
| 7,240,330 B2 | 7/2007 | Fairweather |
| 7,451,397 B2 | 11/2008 | Weber et al. |
| 7,533,069 B2 | 5/2009 | Fairweather |
| 7,685,083 B2 | 3/2010 | Fairweather |
| 7,877,421 B2 | 1/2011 | Berger et al. |
| 7,941,321 B2 | 5/2011 | Greenstein et al. |
| 7,962,495 B2 | 6/2011 | Jain et al. |
| 7,971,150 B2 | 6/2011 | Raskutti et al. |
| 8,117,022 B1 | 2/2012 | Linker |
| 8,132,149 B2 | 3/2012 | Shenfield et al. |
| 8,196,184 B2 | 6/2012 | Amirov et al. |
| 8,271,948 B2 | 9/2012 | Talozi et al. |
| 8,290,926 B2 | 10/2012 | Ozzie et al. |
| 8,332,354 B1 | 12/2012 | Chatterjee et al. |
| 8,418,085 B2 | 4/2013 | Snook et al. |
| 8,489,623 B2 | 7/2013 | Jain et al. |
| 8,554,709 B2 | 10/2013 | Goodson et al. |
| 8,560,494 B1 | 10/2013 | Downing |
| 8,595,234 B2 | 11/2013 | Siripurapu et al. |
| 8,676,857 B1 | 3/2014 | Adams et al. |
| 8,689,182 B2 | 4/2014 | Leithead et al. |
| 8,787,939 B2 | 7/2014 | Papakipos et al. |
| 8,855,999 B1 | 10/2014 | Elliot |
| 8,903,717 B2 | 12/2014 | Elliot |
| 8,930,897 B2 | 1/2015 | Nassar |
| 9,009,827 B1 | 4/2015 | Albertson et al. |
| 9,116,975 B2 | 8/2015 | Shankar et al. |
| 9,201,920 B2 | 12/2015 | Jain et al. |
| 9,223,773 B2 | 12/2015 | Isaacson |
| 9,229,952 B1 * | 1/2016 | Meacham ........... G06F 17/3023 |
| 2002/0095658 A1 | 7/2002 | Shulman |
| 2003/0074187 A1 | 4/2003 | Ait-Mokhtar et al. |
| 2003/0172053 A1 | 9/2003 | Fairweather |
| 2003/0177112 A1 | 9/2003 | Gardner |
| 2004/0044992 A1 | 3/2004 | Muller et al. |
| 2004/0083466 A1 | 4/2004 | Dapp et al. |
| 2004/0111410 A1 | 6/2004 | Burgoon et al. |
| 2004/0193600 A1 | 9/2004 | Kaasten et al. |
| 2004/0205524 A1 | 10/2004 | Richter et al. |
| 2004/0221223 A1 | 11/2004 | Yu et al. |
| 2004/0260702 A1 | 12/2004 | Cragun et al. |
| 2005/0039119 A1 | 2/2005 | Parks et al. |
| 2005/0065811 A1 | 3/2005 | Chu et al. |
| 2005/0091420 A1 | 4/2005 | Snover et al. |
| 2005/0183005 A1 | 8/2005 | Denoue et al. |
| 2006/0074881 A1 | 4/2006 | Vembu et al. |
| 2006/0209085 A1 | 9/2006 | Wong et al. |
| 2006/0242040 A1 | 10/2006 | Rader |
| 2006/0271838 A1 | 11/2006 | Carro |
| 2007/0074169 A1 | 3/2007 | Chess et al. |
| 2007/0078872 A1 | 4/2007 | Cohen |
| 2007/0112714 A1 | 5/2007 | Fairweather |
| 2007/0150369 A1 | 6/2007 | Zivin |
| 2007/0192265 A1 | 8/2007 | Chopin et al. |
| 2007/0208736 A1 | 9/2007 | Tanigawa et al. |
| 2007/0233709 A1 | 10/2007 | Abnous |
| 2008/0034327 A1 | 2/2008 | Cisler et al. |
| 2008/0140387 A1 | 6/2008 | Linker |
| 2008/0148398 A1 | 6/2008 | Mezack et al. |
| 2008/0162616 A1 | 7/2008 | Gross et al. |
| 2008/0228467 A1 | 9/2008 | Womack et al. |
| 2008/0281580 A1 | 11/2008 | Zabokritski |
| 2009/0055251 A1 | 2/2009 | Shah et al. |
| 2009/0150854 A1 * | 6/2009 | Elaasar ................ G06F 8/35 717/104 |
| 2009/0172821 A1 | 7/2009 | Daira et al. |
| 2009/0177962 A1 | 7/2009 | Gusmorino et al. |
| 2009/0228507 A1 | 9/2009 | Jain et al. |
| 2009/0254970 A1 | 10/2009 | Agarwal et al. |
| 2009/0327208 A1 * | 12/2009 | Bittner .............. G06F 17/30507 706/61 |
| 2010/0011282 A1 | 1/2010 | Dollard et al. |
| 2010/0114887 A1 | 5/2010 | Conway et al. |
| 2010/0204983 A1 | 8/2010 | Chung et al. |
| 2010/0228812 A1 | 9/2010 | Uomini |
| 2010/0257015 A1 | 10/2010 | Molander |
| 2010/0306285 A1 | 12/2010 | Shah et al. |
| 2010/0313119 A1 | 12/2010 | Baldwin et al. |
| 2011/0029526 A1 | 2/2011 | Knight et al. |
| 2011/0078055 A1 | 3/2011 | Faribault et al. |
| 2011/0131547 A1 | 6/2011 | Elaasar |
| 2011/0173032 A1 | 7/2011 | Payne et al. |
| 2011/0213791 A1 | 9/2011 | Jain et al. |
| 2011/0258158 A1 | 10/2011 | Resende et al. |
| 2011/0258216 A1 | 10/2011 | Supakkul et al. |
| 2011/0289407 A1 | 11/2011 | Naik et al. |
| 2011/0289420 A1 | 11/2011 | Morioka et al. |
| 2012/0036013 A1 | 2/2012 | Neuhaus et al. |
| 2012/0117082 A1 | 5/2012 | Koperda et al. |
| 2012/0137235 A1 | 5/2012 | TS et al. |
| 2012/0170847 A1 | 7/2012 | Tsukidate |
| 2012/0191446 A1 | 7/2012 | Binsztok et al. |
| 2012/0203708 A1 | 8/2012 | Psota et al. |
| 2012/0221553 A1 | 8/2012 | Wittmer et al. |
| 2012/0245976 A1 | 9/2012 | Kumar et al. |
| 2012/0296907 A1 | 11/2012 | Long et al. |
| 2012/0304150 A1 | 11/2012 | Leithead et al. |
| 2013/0006916 A1 | 1/2013 | McBride et al. |
| 2013/0024268 A1 | 1/2013 | Manickavelu |
| 2013/0046635 A1 | 2/2013 | Grigg et al. |
| 2013/0073454 A1 | 3/2013 | Busch |
| 2013/0086482 A1 | 4/2013 | Parsons |
| 2013/0091084 A1 | 4/2013 | Lee |
| 2013/0110822 A1 | 5/2013 | Ikeda et al. |
| 2013/0117011 A1 * | 5/2013 | Ahmed ................ H04Q 9/00 704/3 |
| 2013/0124193 A1 | 5/2013 | Holmberg |
| 2013/0151148 A1 | 6/2013 | Parundekar et al. |
| 2013/0157234 A1 | 6/2013 | Gulli et al. |
| 2013/0225212 A1 | 8/2013 | Khan |
| 2013/0246560 A1 | 9/2013 | Feng et al. |
| 2013/0251233 A1 | 9/2013 | Yang et al. |
| 2013/0267207 A1 | 10/2013 | Hao et al. |
| 2013/0275446 A1 | 10/2013 | Jain et al. |
| 2013/0311375 A1 | 11/2013 | Priebatsch |
| 2014/0019423 A1 | 1/2014 | Liensberger et al. |
| 2014/0047319 A1 | 2/2014 | Eberlein |
| 2014/0067611 A1 | 3/2014 | Adachi et al. |
| 2014/0095273 A1 | 4/2014 | Tang et al. |
| 2014/0108068 A1 | 4/2014 | Williams |
| 2014/0129261 A1 | 5/2014 | Bothwell et al. |
| 2014/0156527 A1 | 6/2014 | Grigg et al. |
| 2014/0244388 A1 | 8/2014 | Manouchehri et al. |
| 2014/0310266 A1 | 10/2014 | Greenfield |
| 2014/0316911 A1 | 10/2014 | Gross |
| 2015/0019394 A1 | 1/2015 | Unser et al. |
| 2015/0046481 A1 | 2/2015 | Elliot |
| 2015/0100559 A1 | 4/2015 | Nassar |
| 2015/0134666 A1 | 5/2015 | Gattiker et al. |
| 2015/0142766 A1 | 5/2015 | Jain et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0261847 A1 | 9/2015 | Ducott et al. |

FOREIGN PATENT DOCUMENTS

| | | |
|---|---|---|
| DE | 102014215621 | 2/2015 |
| EP | 1672527 | 6/2006 |
| EP | 2221725 | 8/2010 |
| EP | 2778913 | 9/2014 |

(56) References Cited

FOREIGN PATENT DOCUMENTS

| | | |
|---|---|---|
| EP | 2778914 | 9/2014 |
| EP | 2778986 | 9/2014 |
| EP | 2863326 | 4/2015 |
| EP | 2884439 | 6/2015 |
| EP | 2884440 | 6/2015 |
| EP | 2911078 | 8/2015 |
| EP | 3018553 | 5/2016 |
| GB | 2366498 | 3/2002 |
| GB | 2513007 | 10/2014 |
| GB | 2518745 | 4/2015 |
| NL | 2013306 | 2/2015 |
| NL | 2011642 | 8/2015 |
| WO | WO 02/35376 | 5/2002 |
| WO | WO 02/065353 | 8/2002 |
| WO | WO 03/060751 | 7/2003 |
| WO | WO 2008/064207 | 5/2008 |
| WO | WO 2011/071833 | 6/2011 |

OTHER PUBLICATIONS

U.S. Appl. No. 14/306,154, filed Jun. 16, 2014, Office Action Interview, Sep. 9, 2014.
U.S. Appl. No. 14/306,147, filed Jun. 16, 2014, Office Action Interview, Sep. 9, 2014.
U.S. Appl. No. 14/306,138, filed Jun. 16, 2014, Office Action Interview, Sep. 23, 2014.
U.S. Appl. No. 14/319,765, filed Jun. 30, 2014, Office Action Interview, Nov. 25, 2014.
U.S. Appl. No. 14/323,935, filed Jul. 3, 2014, Office Action Interview, Nov. 28, 2014.
U.S. Appl. No. 14/326,738, filed Jul. 9, 2014, Office Action Interview, Dec. 2, 2014.
U.S. Appl. No. 14/319,765, filed Jun. 30, 2014, Office Action Interview, Feb. 4, 2015.
U.S. Appl. No. 14/504,103, filed Oct. 1, 2014, Office Action Interview, Feb. 5, 2015.
U.S. Appl. No. 14/306,138, filed Jun. 16, 2014, Final Office Action, Feb. 18, 2015.
U.S. Appl. No. 14/306,147, filed Jun. 16, 2014, Final Office Action, Feb. 19, 2015.
U.S. Appl. No. 14/306,154, filed Jun. 16, 2014, Final Office Action, Mar. 11, 2015.
U.S. Appl. No. 14/504,103, filed Oct. 1, 2014, Office Action Interview, Mar. 31, 2015.
U.S. Appl. No. 14/323,935, filed Jul. 30, 2014, Office Action Interview, Mar. 31, 2015.
U.S. Appl. No. 14/326,738, filed Jul. 9, 2014, Office Action Interview, Mar. 31, 2015.
U.S. Appl. No. 14/306,154, filed Jun. 16, 2014, Advisory Action, Mar. 15, 2015.
U.S. Appl. No. 14/306,138, filed Jun. 16, 2014, Office Action, May 26, 2015.
U.S. Appl. No. 14/319,765, filed Jun. 30, 2014, Final Office Action, Jun. 16, 2015.
U.S. Appl. No. 14/323,935, filed Jul. 30, 2014, Office Action, Jun. 22, 2015.
U.S. Appl. No. 14/306,154, filed Jun. 16, 2014, Office Action, Jul. 6, 2015.
U.S. Appl. No. 14/326,738, filed Jul. 9, 2014, Final Office Action, Jul. 31, 2015.
U.S. Appl. No. 14/306,147, filed Jun. 16, 2014, Office Action, Aug. 7, 2015.
U.S. Appl. No. 14/306,138, filed Jun. 16, 2014, Final Office Action, Sep. 14, 2015.
Klemmer et al., "Where Do Web Sites Come From? Capturing and Interacting with Design History," Association for Computing Machinery, CHI 2002, Apr. 20-25, 2002, Minneapolis, MN, pp. 8.
Official Communication for European Patent Application No. 14158977.0 dated Mar. 11, 2016.
Official Communication for Australian Patent Application No. 2014201507 dated Feb. 27, 2015.
Official Communication for European Patent Application No. 15192965.0 dated Mar. 17, 2016.
Palantir, "Kite," https://docs.palantir.com/gotham/3.11.1.0/adminreference/datasources.11 printed Aug. 30, 2013 in 2 pages.
Official Communication for Netherlands Patent Application No. 2013306 dated Apr. 24, 2015.
Niepert et al., "A Dynamic Ontology for a Dynamic Reference Work", Joint Conference on Digital Libraries, Jun. 17_22, 2007, Vancouver, British Columbia, Canada, pp. 1-10.
Official Communication for Great Britain Patent Application No. 1413935.6 dated Jan. 27, 2015.
Palantir, "Kite Data-Integration Process Overview," Palantir Technologies, Inc., Copyright 2010, pp. 48.
Official Communication for European Patent Application No. 14158958.0 dated Apr. 16, 2015.
Palantir, https://docs.palantir.com/gotham/3.11.1.0/dataguide/baggage/KiteSchema.xsd printed Apr. 4, 2014 in 4 pages.
Official Communication for Australian Patent Application No. 2014201506 dated Feb. 27, 2015.
Palantir, "The Repository Element," https://docs.palantir.com/gotham/3.11.1.0/dataguide/kite_config_file.04 printed Aug. 30, 2013 in 2 pages.
Palantir, "Extracting and Transforming Data with Kite," Palantir Technologies, Inc., Copyright 2010, pp. 38.
Official Communication for New Zealand Patent Application No. 622513 dated Apr. 3, 2014.
Symantec Corporation, "E-Security Begins with Sound Security Policies," Announcement Symantec, Jun. 14, 2001.
Palantir, "Write a Kite Configuration File in Eclipse," Palantir Technologies, Inc., Copyright 2010, pp. 2.
Palantir, "Kite Operations," Palantir Technologies, Inc., Copyright 2010, p. 1.
Nivas, Tuli, "Test Harness and Script Design Principles for Automated Testing of non-GUI or Web Based Applications," Performance Lab, Jun. 2011, pp. 30-37.
Palermo, Christopher J., "Memorandum," [Disclosure relating to U.S. Appl. No. 13/916,447, filed Jun. 12, 2013, and related applications], Jan. 31, 2014 in 3 pages.
Official Communication for New Zealand Patent Application No. 622497 dated Jun. 19, 2014.
Official Communication for European Patent Application No. 15155845.9 dated Oct. 6, 2015.
Palantir, https://docs.palantir.com/gotham/3.11.1.0/dataguide/baggage/KiteSchema printed Aug. 30, 2013 in 1 page.
Official Communication for New Zealand Patent Application No. 622497 dated Mar. 26, 2014.
Official Communication for Israel Patent Application No. 198253 dated Nov. 24, 2014.
Official Communication for European Patent Application No. 14159464.8 dated Feb. 18, 2016.
Official Communication for European Patent Application No. 14158977.0 dated Jun. 10, 2014.
Delicious, <http://delicious.com/> as printed May 15, 2014 in 1 page.
Morrison et al., "Converting Users to Testers: An Alternative Approach to Load Test Script Creation, Parameterization and Data Corellation," CCSC: Southeastern Conference, JCSC 28, 2, Dec. 2012, pp. 188-196.
Official Communication for Great Britain Patent Application No. 1404479.6 dated Jul. 9, 2015.
Anonymous, "BackTult_JD Edwards One World Version Control System," printed Jul. 23, 2007 in 1 page.
"A Tour of Pinboard," <http://pinboard.in/tour> as printed May 15, 2014 in 6 pages.
Wollrath et al., "A Distributed Object Model for the Java System," Conference on Object-Oriented Technologies and Systems, Jun. 17-21, 1996, pp. 219-231.
Miklau et al., "Securing History: Privacy and Accountability in Database Systems," 3rd Biennial Conference on Innovative Data Systems Research (CIDR), Jan. 7-10, 2007, Asilomar, California, pp. 387-396.

(56) References Cited

OTHER PUBLICATIONS

Official Communication for Great Britain Patent Application No. 1413935.6 dated Dec. 21, 2015.
Official Communication for European Patent Application No. 14158977.0 dated Apr. 16, 2015.
Official Communication for European Patent Application No. 14158958.0 dated Mar. 11, 2016.
Official Communication for Great Britain Patent Application No. 1404479.6 dated Aug. 12, 2014.
Official Communication for European Patent Application No. 14158958.0 dated Jun. 3, 2014.
Official Communication for New Zealand Patent Application No. 622404 dated Mar. 20, 2014.
Official Communication for New Zealand Patent Application No. 622484 dated Apr. 2, 2014.
Official Communication for Canadian Patent Application No. 2666364 dated Jun. 4, 2012.
Geiger, Jonathan G., "Data Quality Management, The Most Critical Initiative You Can Implement", Data Warehousing, Management and Quality, Paper 098-29, SUGI 29, Intelligent Solutions, Inc., Bounder, CO, pp. 14, accessed Oct. 3, 2013.
Official Communication for Australian Patent Application No. 2014201511 dated Feb. 27, 2015.
Johnson, Maggie, "Introduction to YACC and Bison" dated Jul. 8, 2005, 11 pages.
Official Communication for Netherlands Patent Application No. 2012434 dated Jan. 8, 2016.
Kokossi et al., "D7-Dynamic Ontoloty Management System (Design)," Information Societies Technology Program, Jan. 10, 2002, pp. 1-27.
Official Communication for Israel Patent Application No. 198253 dated Jan. 12, 2016.
Official Communication for New Zealand Patent Application No. 622389 dated Mar. 20, 2014.
Official Communication for New Zealand Patent Application No. 622414 dated Mar. 24, 2014.
Official Communication for European Patent Application No. 14159629.6 dated Jul. 31, 2014.
Kahan et al., "Annotea: an Open RDF Infrastructure for Shared Web Annotations", Computer Networks, Elsevier Science Publishers B.V., vol. 39, No. 5, dated Aug. 5, 2002.
Bluttman et al., "Excel Formulas and Functions for Dummies," 2005, Wiley Publishing, Inc., pp. 280, 284-286.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Palmas et al., "An Edge-Bunding Layout for Interactive Parallel Coordinates" 2014 IEEE Pacific Visualization Symposium, pp. 57-64.
Vose et al., "Help File for ModelRisk Version 5," 2007, Vose Software, pp. 349-353. [Uploaded in 2 Parts].
Wikipedia, "Federated Database System," Sep. 7, 2013, retrieved from the internet on Jan. 27, 2015 http://en.wikipedia.org/w/index.php?title=Federated_database_system&oldid=571954221.
Official Communication for European Patent Application No. 14189344.6 dated Feb. 20, 2015.
Official Communication for European Patent Application No. 14197879.1 dated Apr. 28, 2015.
Official Communication for European Patent Application No. 14197895.7 dated Apr. 28, 2015.

* cited by examiner

DOMAIN-SPECIFIC LANGUAGE FOR DATASET TRANSFORMATIONS

PRIORITY BENEFIT CLAIM

This application claims the benefit of Provisional Appln. 62/216,192, filed Sep. 9, 2015, the entire contents of which is hereby incorporated by reference as if fully set forth herein, under 35 U.S.C. §119(e).

FIELD OF THE DISCLOSURE

Embodiments relate to database technology and more specifically, to a domain-specific language for dataset transformations.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A database management system (DBMS) supports generating and modifying stored data. For example, a data definition language (DDL) or a data manipulation language (DML) may be used to interact with a database. However, database interactions may be limited to the basic operations available in the DDL or DML. Furthermore, complex operations written using these basic operations may be error-prone and result in slow processing times.

A DBMS may manage multiple datasets, and data in different datasets are often related by dependencies. Thus, a data change in one dataset may require propagating the data change to another dataset. However, propagating data changes to datasets may involve re-computing an entire dataset. This may tie up computing resources, especially if the data change is relatively small compared to unchanged data.

Figure 1:
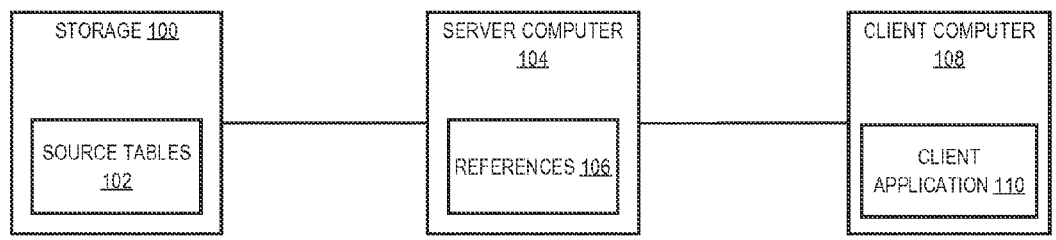
FIG. 1 depicts an example computer architecture on which embodiments may be implemented.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order. For example, a second dataset may be so named although, in reality, it may correspond to a first, second, and/or third dataset.

General Overview

In an embodiment, a domain-specific language (DSL) may interface with an existing DDL and/or DML to offer greater flexibility. For example, the DSL may facilitate generating and/or manipulating datasets stored in volatile and/or non-volatile memory. Datasets may be manipulated based on commands referred to herein as "dataset transformations". Dataset transformations may be created and/or customized by an end user of the DSL. Each dataset transformation may generate an output dataset based on one or more input datasets.

Zero or more dataset transformations may be included in a table definition. The table definition may generate an output table based on zero or more input tables. A sequence for the one or more dataset transformations may be determined based on a graphical representation of the one or more dataset transformations.

The DSL may support efficiently updating tables based on an incremental computation without explicitly invoking the incremental computation. The incremental computation may avoid re-computing a particular table to reflect an update to a dependent table. Instead, the incremental computation may involve performing one or more dataset transformations on a portion of the dependent table that includes the update. The transformed portion may then be incorporated into an older version of the particular table to generate a new version of the particular table that reflects the update.

Example System Environment

FIG. 1 depicts an example computer architecture on which embodiments may be implemented. Referring to FIG. 1, storage computer 100 is communicatively coupled to server computer 104, which is communicatively coupled to client computer 108. Storage 100 includes source tables 102. Server computer 104 includes references 106 to source tables 102. Client computer 108 includes client application 110.

Storage 100 may include one or more database servers, one or more storage devices, and/or one or more of any other system for maintaining source tables 102. For example, storage 100 may be a repository that supports maintaining multiple versions of each source table 102 in such a manner that enables merging changes at any time that is convenient.

Tables (e.g., source tables 102, target tables) may include tabular data that is persisted in storage 100 and/or server computer 104. For example, source tables 102 may be distributed database tables that are stored in a collective non-volatile memory of a cluster of database computers. Tables may be stored in any format, such as JavaScript Object Notation (JSON), Extensible Markup Language (XML), comma-separated values (CSV), a B-tree, and/or a binary encoding.

Server computer 104 may generate tables and/or datasets (e.g., unpersisted data). Server computer 104 may materialize datasets and store them in a volatile memory. Server computer 104 may cause particular datasets to be stored as tables in a non-volatile memory and/or storage 100.

Server computer 104 may include one or more web servers, one or more file servers, and/or one or more of any other interface between storage 100 and client computer 108. Server computer 104 may store copies of tables and/or references 106 to the tables.

References 106 may include pointers, memory addresses, symbolic links, and/or any other indirect reference to a table. Storing references 106 to tables may reduce memory usage and enable data integration in O(1) time.

Storage 100 may be on a separate device from server computer 104. Alternatively, storage 100 may be a persistent storage on server computer 104. Storage 100 and server computer 104 may communicate using a Representational State Transfer (REST) application programming interface (API), a Simple Object Access Protocol (SOAP), and/or any other set of constraints for exchanging information. Source tables 102 in any of a number of different formats may be uploaded to storage 100 and/or server computer 104 based on a plugin that causes source tables 102 to be stored in a common format.

Client application 110 may be a browser, an integrated development environment (IDE), and/or any other user interface. Client application 110 may enable composing a table definition in a DSL. As shall be described in greater detail hereafter, the table definition may include a sequence of one or more dataset transformations to be performed on one or more source tables 102 to generate a target table. The one or more dataset transformations may define the contents of the target table.

The DSL may be independent and different from a DDL and/or a DML used with source tables 102. In other words, server computer 104 may translate between a DSL used with client application 110 and a DDL and/or DML used with source tables 102.

A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. A computer may be a client and/or a server. Any reference to "a computer" herein may mean one or more computers, unless expressly stated otherwise.

Example Table Definitions

Figure 2:
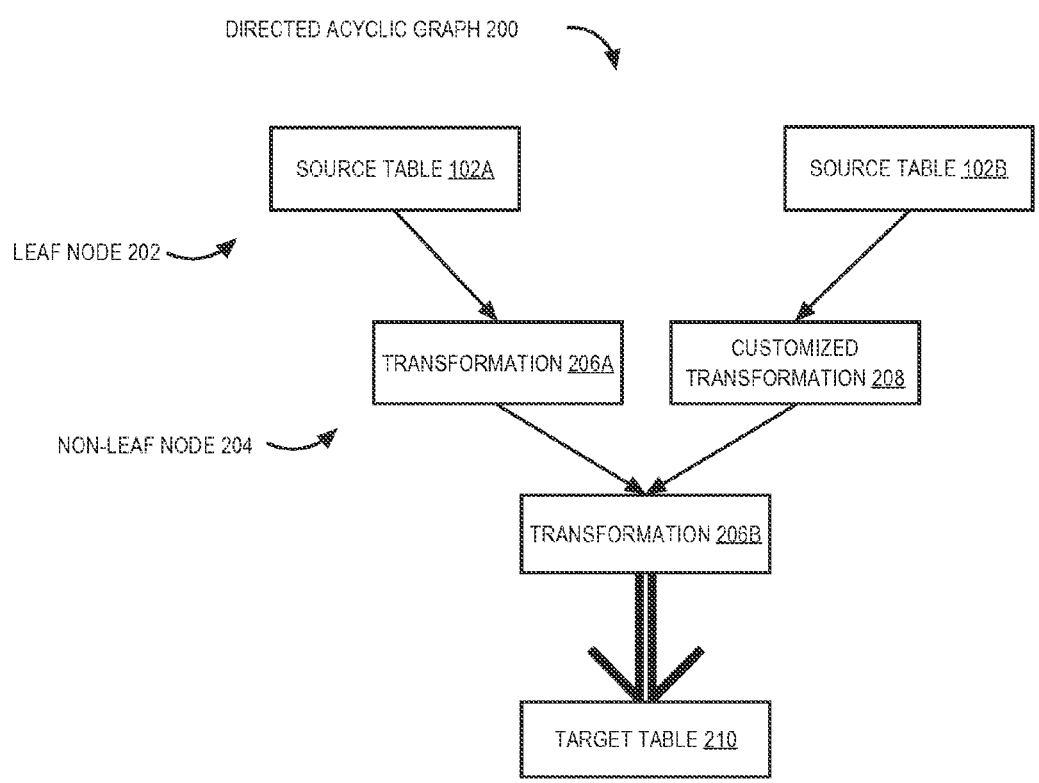
FIG. 2 depicts an example graphical representation of a table definition that includes dataset transformations.

FIG. 2 depicts an example graphical representation of a table definition that includes dataset transformations. Referring to FIG. 2, directed acyclic graph 200 includes leaf node 202 and non-leaf node 204. Leaf node 202 includes source tables 102A-B. Non-leaf node 204 includes transformations 206A-B and customized transformation 208. Target table 210 is generated based on performing transformations 206A-B and customized transformation 208 on source tables 102A-B.

A directed acyclic graph 200 may be a graphical representation of a table definition for a target table 210. The table definition may include one or more dataset transformations (e.g., transformations 206A-B, customized transformation 208) to be performed on one or more source tables 102. The one or more dataset transformations may be represented as verbs, such as "aggregate", "sort", and "drop", that describe an operation that is to be performed in terms of the problem domain instead of how to perform the operation as a sequence of programming language primitives. In other words, table definitions may be composed using declarative programming.

For example, table definition 1 generates target table 210 based on performing transformation 206A on source table 102A.

Table definition 1:
line 1: newTable("target table 210") {
line 2: startWith "source table 102A"
line 3: transformation 206A
line 4: }

Line 3 of table definition 1 indicates that transformation 206A is performed. However, in an embodiment, line 3 may indicate that customized transformation 208 is performed. Dataset transformations shall be described in greater detail hereafter.

In the example of FIG. 2, directed acyclic graph 200 may be a graphical representation of table definition 2. Table definition 2 generates target table 210 based on performing transformations 206A-B and customized transformation 208 on source tables 102A-B.

Table definition 2:
line 1: newTable("target table 210") {
line 2: startWith "source table 102A"
line 3: transformation 206A
line 4: transformation 206B ["dataset"]
line 5: }
line 6: privateTable("dataset") {
line 7: startWith "source table 102B"
line 8: customized transformation 208
line 9: }

Lines 6-9 of table definition 2 appear to be a separate table definition but may operate more like a dataset definition. Typically, "dataset" is materialized but remains unpersisted. In effect, lines 6-9 may be analogous to a Structured Query Language (SQL) CREATE VIEW statement. The dataset resulting from lines 6-9 may be transparent only to table definition 2.

Declarative programming may be used to express the logic of a table definition without describing the control flow of the table definition. Thus, a sequence for the one or more dataset transformations may be determined based on the graphical representation. In the example of FIG. 2, directed acyclic graph 200 indicates that both transformation 206A and customized transformation 208 must be performed prior to transformation 206B. However, transformation 206A and customized transformation 208 may be performed at any time relative to each other.

The directed acyclic graph 200 may include zero or more leaf nodes 202 and zero or more non-leaf nodes 204. The zero or more leaf nodes 202 may represent zero or more tables. In the example of FIG. 2, each leaf node 202 corresponds to a source table 102. In an embodiment, a target table 210 may also be represented by a leaf node 202. Each non-leaf node 204 may represent a dataset transformation.

Example Dataset Transformations

Figure 3:
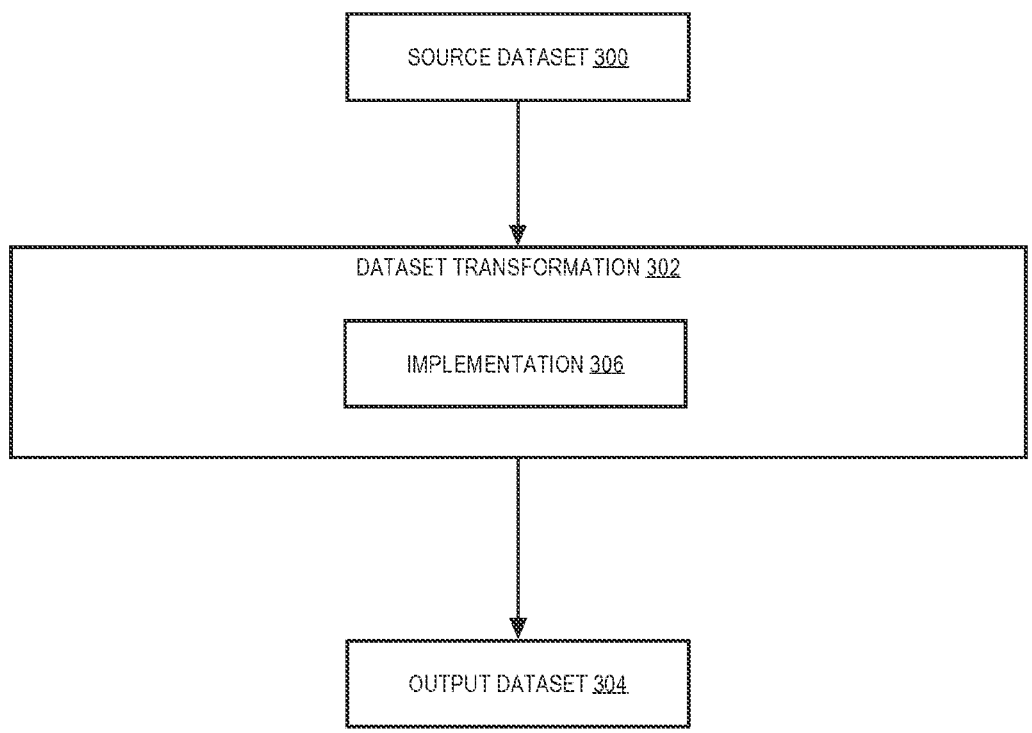
FIG. 3 depicts a detailed view of a dataset transformation, in an example embodiment.

FIG. 3 depicts a detailed view of a dataset transformation, in an example embodiment. Referring to FIG. 3, dataset transformation 302 causes generating output dataset 304 based on an input of source dataset 300. Dataset transformation 302 includes implementation 306.

A dataset (e.g., source dataset 300, output dataset 304) may be a collection of data that is stored in storage 100 and/or server computer 104. Datasets may be stored in a volatile memory and/or persisted in a non-volatile memory. Datasets that are persisted may be called tables.

A dataset that is taken as an input of a dataset transformation 302 is called a source dataset 300, and a dataset that is generated as an output of a dataset transformation 302 is called an output dataset 304. In the example of FIG. 2, source table 102A is a source dataset 300 for transformation 206A, and an output dataset 304 for transformation 206A is a source dataset 300 for transformation 206B. Likewise, source table 102B is a source dataset 300 for customized transformation 208, and an output dataset 304 for customized transformation 208 is a source dataset 300 for transformation 206B. Thus, transformation 206B generates an output dataset 304 based on multiple source datasets 300. The output dataset 304 for transformation 206B becomes target table 210 when it is persisted.

A dataset transformation 302 may be any of a number of operations that are performed on one or more datasets to generate yet another dataset. Each dataset transformation may be associated with an implementation 306 that includes code for causing a particular operation to be performed. As mentioned above, dataset transformations 302 may describe what is to be accomplished without describing how to accomplish it. Thus, an implementation 306 may describe how a dataset transformation 302 is to be performed.

Referring to FIG. 3, dataset transformation 302 may be transformation 206A, transformation 206B, or customized transformation 208 of FIG. 2. Thus, dataset transformation 302 may be an operation that is available in a DSL by default (e.g., transformation 206A-B) or an operation that is defined by an end user of the DSL (e.g., customized transformation 208).

For example, in FIG. 2, source table 102A may represent the following table:

| ID | Major |
|---|---|
| 1 | Peace Studies |
| 2 | Software Engineering |
| 3 | Computer Engineering |

Transformation 206A may be an operation that filters out non-engineering majors. An implementation 306 of transformation 206A may include a function that compares each string value in a particular column with the string values in an enumerated list and returns a Boolean value. Source table 102A may be a source dataset 300 that is provided as input to transformation 206A to generate an output dataset 304 that represents the following data:

| ID | Major |
|---|---|
| 2 | Software Engineering |
| 3 | Computer Engineering |

Source table 102B may represent the following table:

| ID | GPA |
|---|---|
| 1 | 2.0 |
| 2 | 1.7 |
| 3 | 0.9 |
| 4 | 1.5 |

Customized transformation 208 may be an operation that increments numeric values by two. An implementation 306 of customized transformation 208 may include a function that adds two to each numeric value in a particular column. Thus, source table 102B may be a source dataset 300 that is provided as input to customized transformation 208 to generate an output dataset 304 that represents the following data:

| ID | GPA |
|---|---|
| 1 | 4.0 |
| 2 | 3.7 |
| 3 | 2.9 |
| 4 | 3.5 |

Transformation 206B may be an operation that joins datasets into a composite dataset based on matching values in a respective column of each dataset. An implementation 306 of transformation 206B may include a function that performs an operation similar to a SQL INNER JOIN operation. For example, the output datasets 304 for transformation 206A and customized transformation 208 may be provided as input to transformation 206B to generate an output dataset 304 that represents the following data:

| ID | Major | GPA |
|---|---|---|
| 2 | Software Engineering | 3.7 |
| 3 | Computer Engineering | 2.9 |

If this data is persisted, it may be called target table 210.

Example Parallel Computing Optimization

Figure 4:
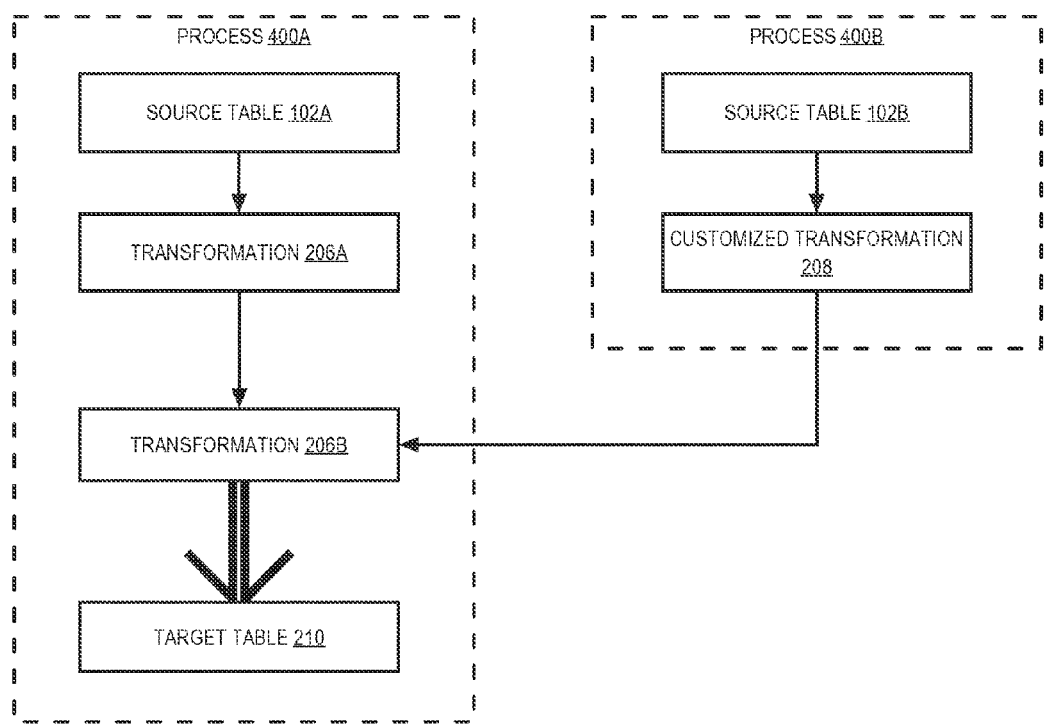
FIG. 4 depicts an example optimization involving parallel computing.

FIG. 4 depicts an example optimization involving parallel computing. Referring to FIG. 4, processes 400A-B perform transformation 206A and customized transformation 208 in parallel to generate target table 210 based on source tables 102A-B.

Processes 400A-B may exist on a single computer or on multiple computers. For example, processes 400A-B may represent different threads on server computer 104 or two different server computers 104.

As mentioned above, a sequence of one or more dataset transformations 302 may be determined based on a graphical representation of the one or more dataset transformations 302. For example, the graphical representation depicted in FIG. 2 may indicate that transformation 206A and customized transformation 208 may be performed concurrently in a multi-threaded application.

Example Incremental Computation Optimization

When a source table 102 is updated with a data change, the data change may be incorporated into a table that depends on the source table 102. However, incorporating the data change may involve completely rebuilding the table that depends on the source table 102. For example, at T1, a particular table may be generated based on performing a particular dataset transformation 302 on a source table 102. At T2, the source table 102 may be updated. Thus, at T3, the particular dataset transformation 302 may be performed on the updated source table 102 to generate an updated version of the particular table.

Completely rebuilding a table may be computationally intensive, especially if updates are frequent. Furthermore, in some situations, completely rebuilding a table may inefficiently incorporate updates. For example, in the example datasets above for FIG. 2, source table 102A may be updated to generate the following table:

| ID | Major |
|---|---|
| 1 | Peace Studies |
| 2 | Software Engineering |
| 3 | Computer Engineering |
| 4 | Electrical Engineering |

Note that the updated source table is generated based on appending the last row to the previous version of source table 102A. In this situation, instead of performing relevant dataset transformations 302 on the updated source table in its entirety, it would be more efficient to perform the relevant dataset transformations 302 on an appended portion (e.g., the last row) of the updated source table. The transformed appended portion may then be combined with the table previously generated based on the previous version of source table 102A. This is called incremental computation.

Figure 5A:
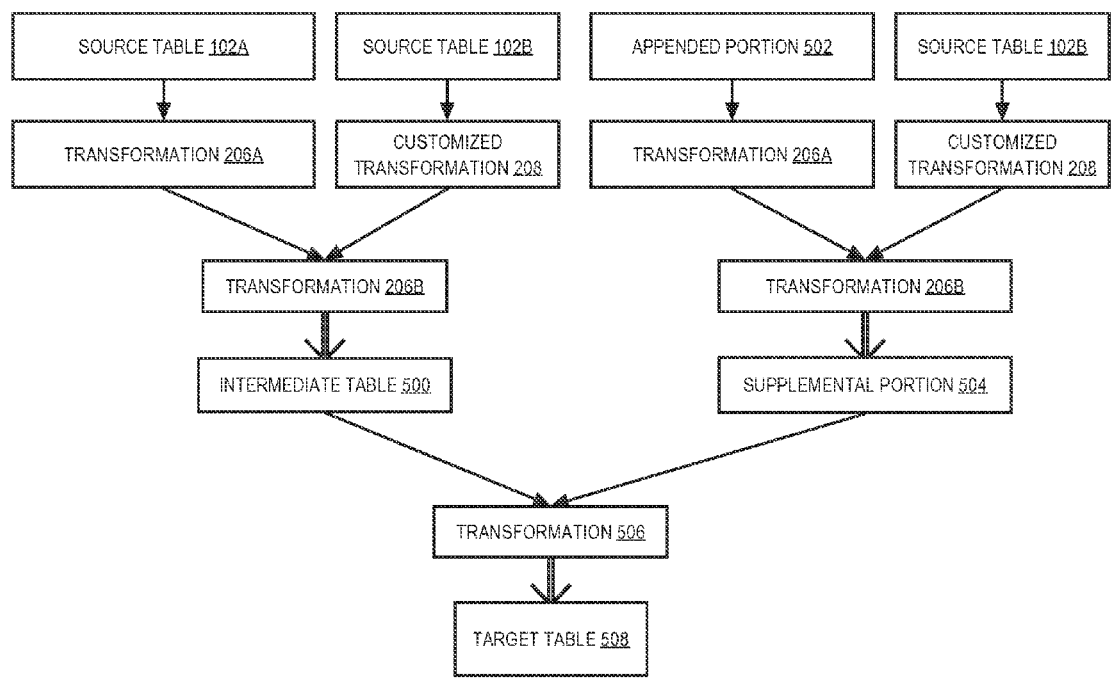
FIGS. 5A-B depict example graphical representations of incremental computation.
Figure 5B:
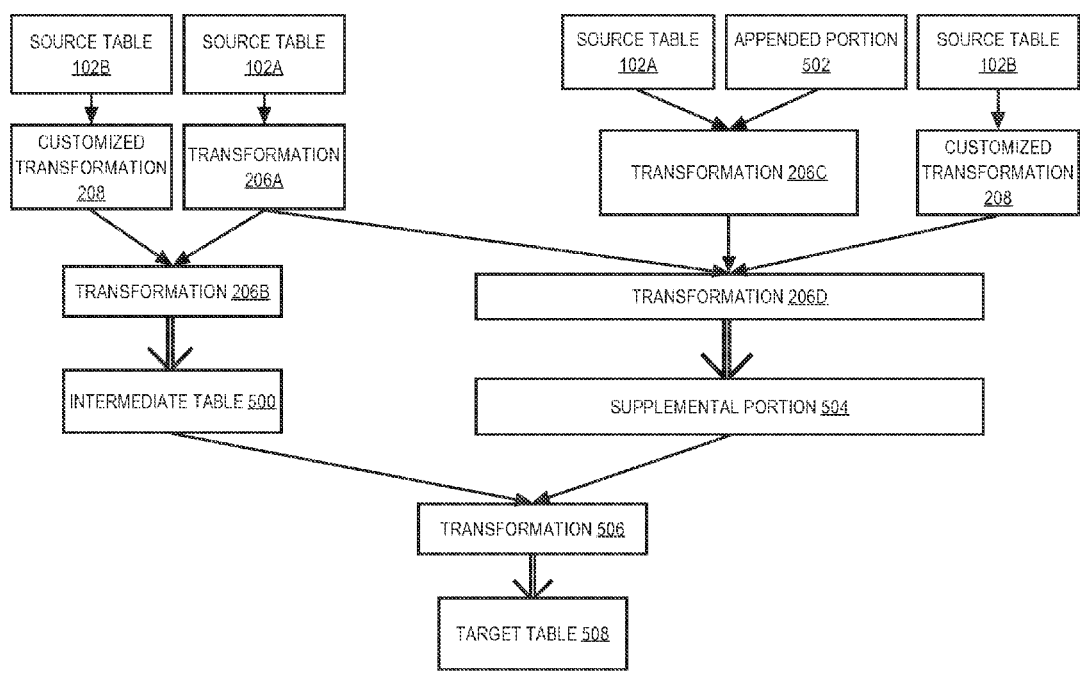

FIGS. 5A-B depict example graphical representations of incremental computation. Referring to FIG. 5A, intermediate table 500 is generated based on performing transformations 206A-B and customized transformation 208 on source tables 102A-B. Supplemental portion 504 is generated based on performing transformations 206A-B and customized transformation 208 on appended portion 502 and source table 102B. However, in an embodiment (e.g., FIG. 5B), supplemental portion 504 may be generated based on performing one or more transformations 206 on source table 102A as well as appended portion 502. Target table 508 is generated based on performing transformation 506 on intermediate table 500 and supplemental portion 504. Note that incremental computation may be an optimization that is performed without an end user specifying transformation 506 and any of the operations used to generate supplemental portion 504.

Intermediate table 500 of FIG. 5A corresponds to target table 210 of FIG. 2. Intermediate table 500 is generated and persisted prior to generating supplemental portion 504. Thus, intermediate table 500 may be retrieved from storage 100 and/or server computer 104 prior to generating target table 508.

In the example of FIG. 5A, appended portion 502 is a portion of an updated source table that was appended to a previous version of source table 102A. Although depicted in the example updated source table above as the last row, appended portion 502 may be data that is added at any of a number of locations. For example, appended portion 502 may be a new first row, a new column, etc.

A supplemental portion 504 may be a portion of an intermediate table 500 that reflects an update to a source table 102. The supplemental portion 504 may be generated based on performing a set of one or more dataset transformations 302 on an appended portion 502 and/or one or more source tables 102. The set of one or more dataset transformations 302 may be similar to that used to generate an intermediate table 500. In FIG. 5A, supplemental portion 504 may represent the following data:

| ID | Major | GPA |
|---|---|---|
| 4 | Electrical Engineering | 3.5 |

Supplemental portion 504 may be a dataset and/or a table.

Transformation 506 may be an operation that combines one dataset with another dataset to generate a composite dataset. In the example of FIG. 5A, intermediate table 500 and supplemental portion 504 are provided as input to transformation 506 to generate an output dataset 304 that represents the following data:

| ID | Major | GPA |
|---|---|---|
| 2 | Software Engineering | 3.7 |
| 3 | Computer Engineering | 2.9 |
| 4 | Electrical Engineering | 3.5 |

If this data is persisted, it may be called target table 508.

Referring to FIG. 5B, transformation 206C may be similar to or different from transformation 206A, and transformation 206D may be similar to or different from transformation 206B. FIG. 5B differs from FIG. 5A in that supplemental portion 504 depends on source table 102A as well as appended portion 502. For example, in FIG. 5B, transformation 206A may be an operation that takes the last two rows of source table 102A. However, appended portion 502 may consist of only one row. Thus, transformation 206C may take as input the last row of source table 102A in addition to appended portion 502.

Approach for Determining Availability of Incremental Computation

Incremental computation may be an optimization that is available for deriving a target table 508 based on one or more criteria. The one or more criteria may include one or more of the following:
- an incremental status of a source table 102A
- an incremental computability of a dataset transformation 302

Incremental Status of a Source Table

An incremental status of a source table 102A refers to a manner in which an update is incorporated into the source table 102A. An incremental status of "full" indicates that a target table 210 that depends on an updated source table must be completely rebuilt, whereas an incremental status of "incremental" indicates that incremental computation may be used to generate a target table 508 based on the updated source table. For example, a source table 102B without any updates may have an incremental status of "full". Similarly, if an update replaces any data in a source table 102A, the source table 102A may have an incremental status of "full". In contrast, an update that adds data to a source table 102A without replacing any data in the source table 102A may have an incremental status of "incremental".

A target table 508 may be derived based on incremental computation if the target table 508 depends on at least one source table 102A with an incremental status of "incremental". In other words, incremental computation may be available if at least one source table 102A incorporates an update by appending the update.

Incremental Computability of a Dataset Transformation

An incremental computability of a dataset transformation 302 may be categorized as one or more of the following:
a "concatenate" type
a "merge and append" type
a "merge and replace" type
an "impossible" type A "concatenate" type corresponds to a dataset transformation 302 that can be computed efficiently by appending data to a previous result of the dataset transformation 302 without requiring access to the previous result. For example, a "rename" transformation may correspond to a "concatenate" type, because the "rename" transformation can change the name of a column in an update without accessing a previous renaming of the column.

Like the "concatenate" type, a "merge and append" type corresponds to a dataset transformation 302 that can be computed efficiently by appending data to a previous result of the dataset transformation 302. However, the "merge and append" type requires access to the previous result. For example, a "distinct" transformation may correspond to a "merge and append" type, because the "distinct" transformation removes duplicate rows. Removing duplicate rows in an update cannot be performed confidently without checking for duplicate rows between the update and, for example, the previous result of removing duplicate rows.

A "merge and replace" type corresponds to a dataset transformation 302 that can be computed efficiently by replacing data in a previous result of the dataset transformation 302. Like the "merge and append" type, the "merge and replace" type requires access to the previous result. For example, an "aggregate" transformation consisting of a "sum" operation may correspond to a "merge and replace" type, because the "sum" operation calculates a subtotal for an update, which is then added to a previous total to calculate a new total that replaces the previous total.

An "impossible" type corresponds to a dataset transformation 302 that cannot take advantage of a previous result to perform incremental computation. In other words, the "impossible" type may correspond to a dataset transformation 302 that does not correspond to one of the aforementioned types. For example, an "aggregate" transformation including a "mostFrequentValue" operation may correspond to an "impossible" type, because the statistical mode of a previous result does not necessarily inform the statistical mode of an updated set of data.

Like source tables 102, dataset transformations 302 may be associated with an incremental status. An incremental status of "full" corresponds to a "merge and replace" type of incremental computability. However, an incremental status of "incremental" corresponds to either a "concatenate" type or a "merge and append" type of incremental computability.

A dataset transformation 302 may be associated with multiple types of incremental computability based on one or more dependencies of the dataset transformation 302. The one or more dependencies may include source tables 102 and/or other dataset transformations that provide input to the dataset transformation 302. For example, a dataset transformation 302 with two dependencies may correspond to a "concatenate" type if the first dependency has an incremental status of "incremental", a "merge and append" type if the second dependency has an incremental status of "incremental", and an "impossible" type if each dependency has an incremental status of "incremental".

Furthermore, a dependency of a dataset transformation 302 may be characterized as "reversible" if the dependency can be reconstructed from an output of the dataset transformation 302. In other words, a reversible dependency may be a dependency that can be derived based on performing an inverse dataset transformation on an output dataset 304. For example, a source dataset 300 of a dataset transformation 302 that adds one to particular values is "reversible", because an output dataset 304 of the dataset transformation 302 can be subjected to an inverse operation that subtracts one from the particular values to derive the source dataset 300.

In an embodiment, incremental computation may be available if both of the following criteria are satisfied:
Each dataset transformation 302 with at least one dependency that has an incremental status of "incremental" corresponds to a "concatenate" type, a "merge and append" type, and/or a "merge and replace" type of incremental computability.
Each dependency that is and/or depends on a dataset transformation 302 corresponding to a "merge and append" type and/or a "merge and replace" type of incremental computability is a reversible dependency.

Example Incremental Computation Analysis

In the example of FIG. 5A, source table 102A has an incremental status of "incremental", and source table 102B has an incremental status of "full". Since source table 102A is a dependency of transformation 206A, the incremental computability of transformation 206A must be assessed. Thus, in order for target table 508 to be generated based on incremental computation, transformation 206A must correspond to a "concatenate" type, a "merge and append" type, and/or a "merge and replace" type of incremental computability.

Transformation 206A may be an operation that filters out non-engineering majors. Since two portions of a dataset can be filtered independently and then combined to yield the same result as filtering the dataset in its entirety, transformation 206A corresponds to a "concatenate" type of incremental computability. Furthermore, since a dataset transformation 302 corresponding to a "concatenate" type is a dependency that has an incremental status of "incremental," transformation 206A has an incremental status of "incremental". Thus, in order for target table 508 to be generated based on incremental computation, the incremental computability of transformation 206B must also be assessed.

Transformation 206B may be analogous to a SQL INNER JOIN operation. Since performing transformation 206B on a dataset in its entirety yields the same result as combining two portions of the dataset upon which transformation 206B has been performed separately, transformation 206B corresponds to a "concatenate" type of incremental computability.

Note that transformation 506 is irrelevant to determining whether target table 508 can be generated based on incremental computation, because transformation 506 will become part of the implementation of incremental computation once it is determined to be appropriate. In other words, only the dataset transformations 302 depicted in FIG. 2 are relevant to the incremental computation analysis.

As a result of the foregoing incremental computation analysis, server computer 104 may determine that target table 508 can be generated using incremental computation. Server computer 104 may be configured to perform incremental computation whenever server computer 104 determines that incremental computation is available.

Approach for Executing a Table Definition

Figure 6:
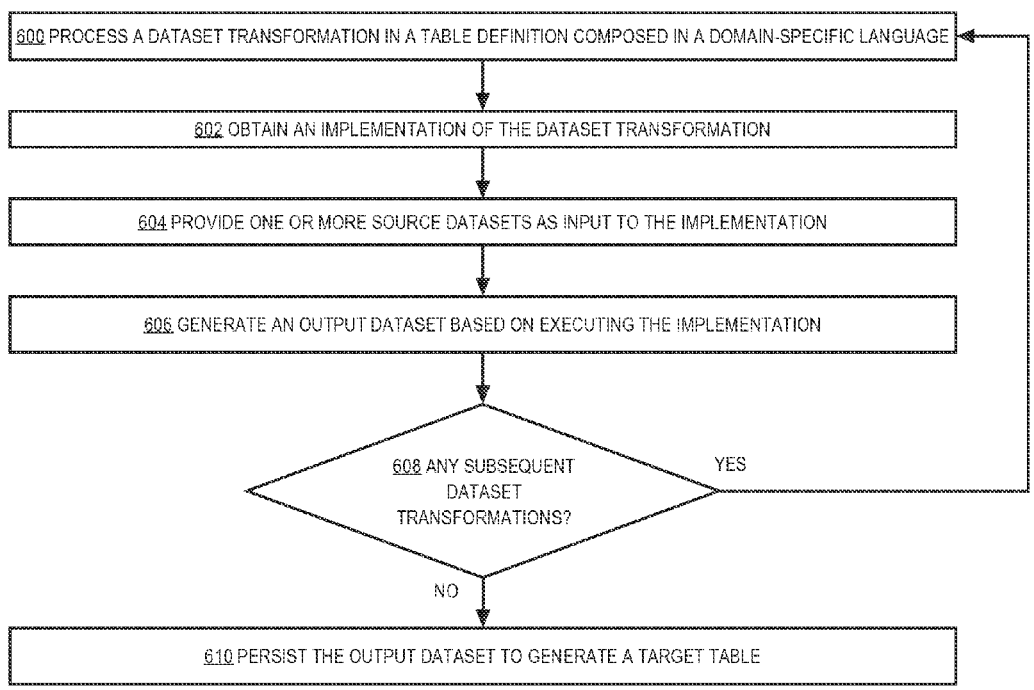
FIG. 6 is a flow diagram that depicts an approach for executing a table definition.

FIG. 6 is a flow diagram that depicts an approach for executing a table definition. At block 600, a server computer 104 may process a dataset transformation 302. The dataset transformation 302 may be included in a table definition that was received from a client computer 108. The table definition may be composed in a DSL. The DSL may be specialized for expressing dataset transformations 302 using declarative programming.

At block 602, the server computer 104 may obtain an implementation 306 of the dataset transformation 302. The table definition may exclude the implementation 306 to facilitate manipulating data. The implementation 306 may be obtained from a separate file at the server computer 104.

At block 604, the server computer 104 may provide the implementation 306 with one or more source datasets 300 as input. The one or more source datasets 300 may be retrieved from a storage 100 and/or from the server computer 104. For example, the server computer 104 may rebuild a source dataset 300 that was previously retrieved from a storage 100 but subsequently removed from a volatile memory due to a failure. Rebuilding lost datasets may be based on logs maintained by the server computer 104 that record a lineage (e.g., a table definition, source datasets 300, dataset transformations 302) of a lost dataset.

At block 606, the server computer 104 may generate an output dataset 304 based on executing the implementation 306. The output dataset 304 may be a transformed source dataset and/or a composite of multiple source datasets 300. The output dataset 304 may be stored in volatile memory.

At block 608, the server computer 104 may determine whether the table definition includes any subsequent dataset transformations 302. A subsequent dataset transformation 302 may be determined based on a graphical representation of the table definition. If the table definition includes any subsequent dataset transformations 302, the output dataset 304 may be used as a source dataset 300 for an immediately subsequent dataset transformation 302. Processing the immediately subsequent dataset transformation 302 may involve a process (not shown) similar to repeating blocks 600-606. However, if the table definition fails to include any subsequent dataset transformations 302, block 608 may proceed to block 610.

At block 610, the server computer 104 may generate a target table 210, 508 based on persisting the output dataset 304. The target table 210, 508 may be stored at server computer 104 and/or storage 100.

Approach for Performing Incremental Computation

Figure 7:
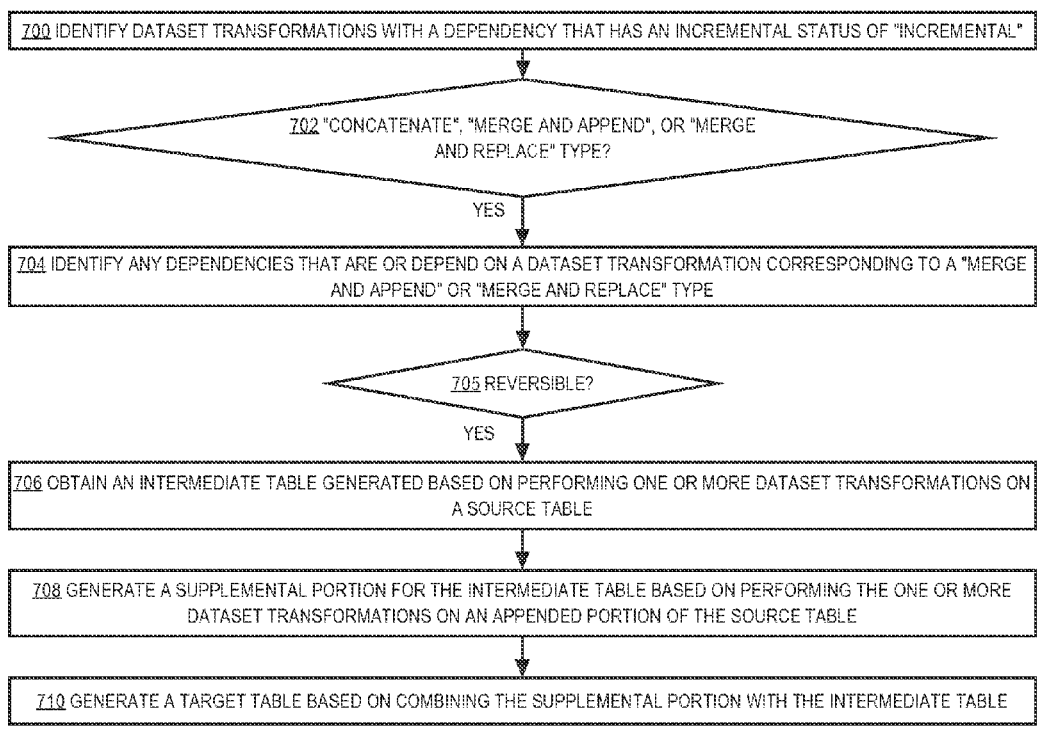
FIG. 7 is a flow diagram that depicts an approach for performing incremental computation.

FIG. 7 is a flow diagram that depicts an approach for performing incremental computation. At block 700, a server computer 104 may identify dataset transformations 302 with a dependency that has an incremental status of "incremental". In other words, the server computer 104 may determine whether one or more source tables 102 were updated based on appending (e.g., adding without replacing) data. Furthermore, the server computer 104 may identify any dataset transformations 302 that depend directly or indirectly on the one or more source tables 102 and determine whether any dataset transformations 302 have an incremental status of "incremental". Thus, block 700 may be performed concurrently with block 702.

At block 702, the server computer 104 may determine whether each dataset transformation 302 identified at block 700 corresponds to a "concatenate" type, a "merge and append" type, and/or a "merge and replace" type of incremental computability. If each dataset transformation 302 is determined to correspond to an incremental computability type other than an "impossible" type, block 702 proceeds to block 704. Otherwise, the incremental computation analysis ends and incremental computation is determined to be unavailable.

At block 704, the server computer 104 may identify any dependencies that are or depend on a dataset transformation corresponding to a "merge and append" type and/or a "merge and replace" type. Incremental computation may still be available if such dependencies are reversible.

At block 705, the server computer 104 may determine whether each dependency identified at block 704 is reversible. If any of the identified dependencies is not reversible, the incremental computation analysis ends and incremental computation is determined to be unavailable. Otherwise, block 705 proceeds to block 706.

At block 706, the server computer 104 may obtain an intermediate table 500 generated based on performing one or more dataset transformations 302 on a source table 102. Although depicted in FIG. 7 as being performed after block 700, block 706 may be performed prior to block 700, after block 708, or at any other suitable time. For example, block 706 of FIG. 7 may correspond to block 610 of FIG. 6.

At block 708, the server computer 104 may generate a supplemental portion 504 for the intermediate table 500 based on performing the one or more dataset transformations 302 on at least an appended portion 502 of the source table 102. In an embodiment, the one or more dataset transformations 302 may also be performed on the source table 102.

At block 710, the server computer 104 may generate a target table 210, 508 based on combining the supplemental portion 504 with the intermediate table 500. Combining the supplemental portion 504 with the intermediate table 500 may involve performing a dataset transformation 302 on the supplemental portion 504 and the intermediate table 500. For example, combining the supplemental portion 504 with the intermediate table 500 may involve performing a square root operation to derive subtotals for the supplemental portion 504 and the intermediate table 500, adding the subtotals to derive a total, and squaring the total. An output dataset 304 of the dataset transformation 302 may be persisted to generate the target table 210, 508.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
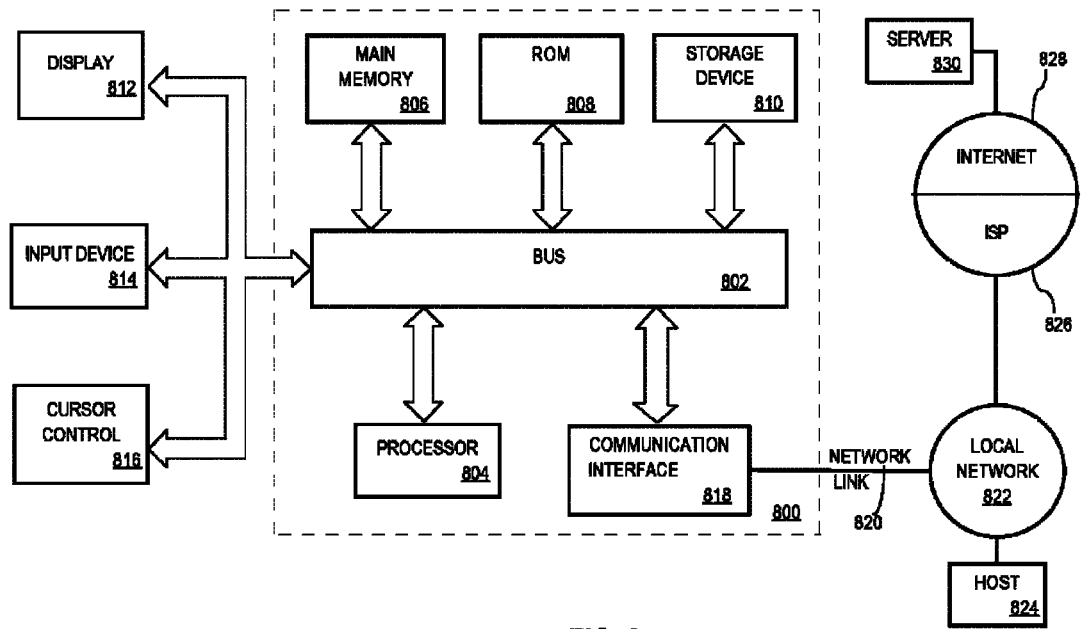
FIG. 8 depicts a computer system upon which an embodiment may be implemented.

For example, FIG. 8 is a block diagram that depicts a computer system 800 upon which an embodiment may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
processing a table definition composed in a domain-specific language, the table definition comprising a sequence of one or more dataset transformations to be performed on one or more source tables to generate a target table, wherein the one or more dataset transformations comprises a customized transformation;
based on processing the customized transformation in the one or more dataset transformations:
obtaining an implementation of the customized transformation;
executing the implementation based on providing a source dataset as input to the implementation;
generating an output dataset as a result of executing the implementation;
wherein an intermediate table is generated based on performing at least one dataset transformation of the one or more dataset transformations on a particular source table of the one or more source tables;
wherein the one or more source tables comprise an appended portion of the particular source table;
wherein the target table is generated based on:
generating a supplemental portion for the intermediate table based on performing the at least one dataset transformation on the appended portion of the particular source table;
combining intermediate table with the supplemental portion for the intermediate table;
wherein the method is performed by one or more computing devices.

2. The method of claim 1, wherein the one or more dataset transformations are performed in parallel.

3. The method of claim 1, wherein the sequence of one or more dataset transformations is determined based on a graphical representation of the one or more dataset transformations.

4. The method of claim 3, wherein the graphical representation is a directed acyclic graph.

5. The method of claim 3, wherein the graphical representation comprises one or more leaf nodes and one or more non-leaf nodes, the one or more leaf nodes representing one or more tables, the one or more non-leaf nodes representing the one or more dataset transformations.

6. The method of claim 1, wherein the target table is generated based on persisting the output dataset.

7. The method of claim 1, wherein one or more references to the one or more source tables are stored at a server computer in such a manner that the one or more source tables remain uncopied to the server computer.

8. A system comprising:
one or more processors; and
one or more storage media storing instructions which, when executed by the one or more processors, cause:
processing a table definition composed in a domain-specific language, the table definition comprising a sequence of one or more dataset transformations to be performed on one or more source tables to generate a target table, wherein the one or more dataset transformations comprises a customized transformation;
based on processing the customized transformation in the one or more dataset transformations:
obtaining an implementation of the customized transformation;
executing the implementation based on providing a source dataset as input to the implementation;
generating an output dataset as a result of executing the implementation;
wherein an intermediate table is generated based on performing at least one dataset transformation of the one or more dataset transformations on a particular source table of the one or more source tables;
wherein the one or more source tables comprise an appended portion of the particular source table;
wherein the target table is generated based on:
generating a supplemental portion for the intermediate table based on performing the at least one dataset transformation on the appended portion of the particular source table;
combining intermediate table with the supplemental portion for the intermediate table.

9. The system of claim 8, wherein the one or more dataset transformations are performed in parallel.

10. The system of claim 8, wherein the sequence of one or more dataset transformations is determined based on a graphical representation of the one or more dataset transformations.

11. The system of claim 10, wherein the graphical representation is a directed acyclic graph.

12. The system of claim 10, wherein the graphical representation comprises one or more leaf nodes and one or more non-leaf nodes, the one or more leaf nodes representing one or more tables, the one or more non-leaf nodes representing the one or more dataset transformations.

13. The system of claim 8, wherein the target table is generated based on persisting the output dataset.

14. The system of claim 8, wherein one or more references to the one or more source tables are stored at a server computer in such a manner that the one or more source tables remain uncopied to the server computer.

* * * * *